US006819260B2

(12) United States Patent
Gardner et al.

(10) Patent No.: US 6,819,260 B2
(45) Date of Patent: Nov. 16, 2004

(54) SYNCHRONOUS CDMA TELEMETRY SYSTEM FOR USE IN A WELLBORE

(75) Inventors: Wallace R. Gardner, Houston, TX (US); Roger L. Schultz, Aubrey, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 490 days.

(21) Appl. No.: 10/061,921

(22) Filed: Feb. 1, 2002

(65) Prior Publication Data

US 2003/0006906 A1 Jan. 9, 2003

(30) Foreign Application Priority Data

Jul. 3, 2001 (US) ................................ PCT/US01/07181

(51) Int. Cl.[7] ................................................ G01V 3/00
(52) U.S. Cl. ........................ 340/855.5; 340/855.4; 340/855.3; 340/853.1
(58) Field of Search .................... 340/853.1, 855.3, 340/855.4, 855.5; 455/500, 502, 67.11; 370/342

(56) References Cited

U.S. PATENT DOCUMENTS

| | | | |
|---|---|---|---|
| 5,905,721 A | 5/1999 | Liu et al. | |
| 5,933,454 A | 8/1999 | Ciodfi | |
| 6,046,685 A | 4/2000 | Tubel | |
| 6,144,859 A | 11/2000 | LaDue | |
| 6,184,798 B1 | 2/2001 | Egri | |
| 6,317,029 B1 | 11/2001 | Fleeter | |
| 6,496,705 B1 | 12/2002 | Ng et al. | |
| 6,691,779 B1 * | 2/2004 | Sezginer et al. | ....... 166/250.01 |
| 6,693,553 B1 * | 2/2004 | Ciglenec et al. | ......... 340/853.1 |

FOREIGN PATENT DOCUMENTS

| | | |
|---|---|---|
| EP | 0 859 472 A1 | 8/1998 |
| WO | WO 00/29717 | 5/2000 |
| WO | WO 01/08326 A1 | 2/2001 |

OTHER PUBLICATIONS

Search Report For PCT Application No.: PCT/US01/07181.

* cited by examiner

Primary Examiner—Albert K Wong
(74) Attorney, Agent, or Firm—Marlin R. Smith (57) ABSTRACT

A synchronous CDMA telemetry system is provided for use in a wellbore. In one described embodiment, each data bit of digital outputs of multiple downhole data sources is multiplied by an orthogonal code unique to each data source. The resulting encoded outputs are modulated on a carrier frequency and summed on a transmission channel. The resulting signal is demodulated at a remote location and separately multiplied by each of the codes to separate out the contributions to the signal from each data source. The individual demodulated and decoded outputs are then integrated over the length of each data bit.

33 Claims, 4 Drawing Sheets

SYNCHRONOUS CDMA TELEMETRY SYSTEM FOR USE IN A WELLBORE

CROSS-REFERENCE TO RELATED APPLICATION

This application claims the benefit under 35 USC §119 of the filing date of PCT Application No. PCT/US01/07181, filed Mar. 7, 2001, the disclosure of which is incorporated herein by this reference.

TECHNICAL FIELD

The present invention relates generally to telemetry systems utilized in conjunction with subterranean wells and, in an embodiment described herein, more particularly provides a synchronous CDMA telemetry system for use in a wellbore.

BACKGROUND

There exists a need for a method of transmitting data at very high rates in subterranean wells. One example of such a need is that of transmitting very high data rate seismic data from geophones positioned in a wellbore. In this example, a data rate of 30 Mbps might be required.

Unfortunately, a data rate of 30 Mbps is far greater than the capabilities of present telemetry systems. For example, conventional wireline logging telemetry systems are capable of only about 300 Kbps, which is two orders of magnitude less than the desired data rate.

Furthermore, conventional wireline logging telemetry systems are not designed to transmit data from widely distributed data sources. Instead, the data sources used with wireline logging tools are typically closely arranged in a well. Transmission of data from widely distributed data sources, on the other hand, can cause delays in relative transmission times between the respective data sources, thereby altering the relationships between the transmitted data.

In the case of seismic data, it is important for evaluation of the data that the data from separate sensors measured at a particular time be transmitted in a manner which permits this time relationship to be preserved. One manner of furthering this goal is to transmit the data from separate sources simultaneously via the same transmission channel. However, transmission of data from separate sources via the same transmission channel presents other challenges, such as how to differentiate one source's data from another source's data.

SUMMARY

In carrying out the principles of the present invention, in accordance with an embodiment thereof, a method is provided which solves the above problem in the art.

In one aspect of the invention, the method includes the steps of installing multiple sensors in a wellbore, multiplying each data bit of each sensor's output by a digital code and simultaneously transmitting the encoded sensor outputs to a remote location via a transmission channel. Each of the sensors is included in a sensor node and produces a respective digital output. In an example of the method, the sensors are geophones widely distributed in a wellbore, and the sensor nodes are all connected to a cable serving as the transmission channel.

In another aspect of the invention, the codes used to encode the sensor outputs are unique to each of the sensors and are orthogonal with respect to each other. Preferably, the codes are walesh codes. In this manner, the encoded outputs may be transmitted simultaneously on the same transmission channel without interference or cross-talk between the transmissions.

In yet another aspect of the invention, the encoded sensor outputs are modulated on a carrier frequency prior to being summed on the transmission channel. When the resulting signal is received at the remote location, it is demodulated. The demodulated signal is then separately multiplied by each of the codes to produce respective decoded transmissions containing separate contributions to the signal. These separate decoded transmissions are then integrated over the length of each data bit to produce an output from which the original data may be interpreted.

In still another aspect of the invention, the transmissions from the various sensor nodes are synchronized. A phase lock loop is used to phase lock the transmissions. A sliding correlator is used to obtain synchronization by adjusting an offset timer of each sensor node. An early-late correlator is used to maintain synchronization.

These and other features, advantages, benefits and objects of the present invention will become apparent to one of ordinary skill in the art upon careful consideration of the detailed description of a representative embodiment of the invention hereinbelow and the accompanying drawings.

DETAILED DESCRIPTION

Figure 1:
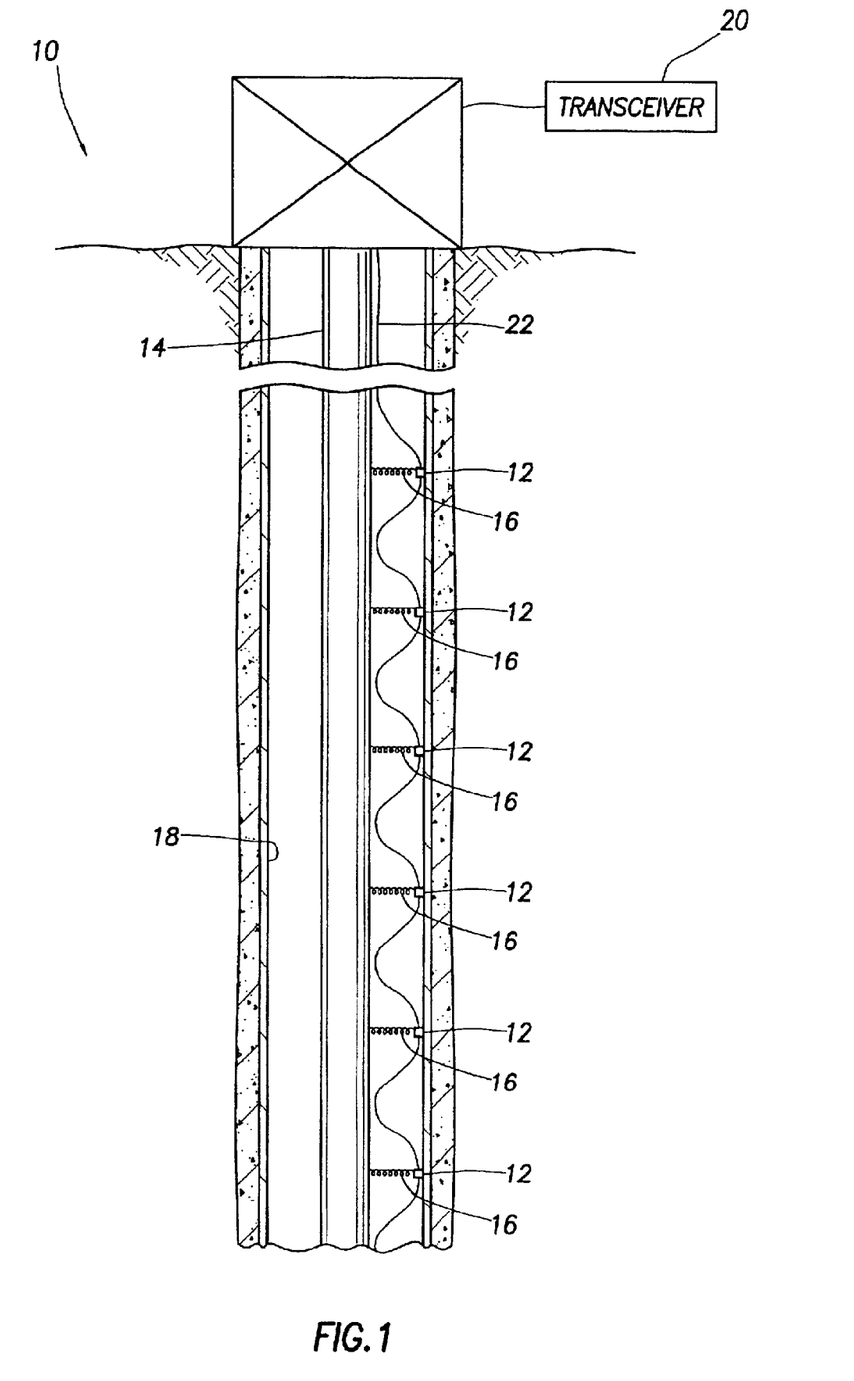
FIG. 1 is a schematic view of a method embodying principles of the present invention.

Representatively illustrated in FIG. 1 is a method 10 which embodies principles of the present invention. In the following description of the method 10 and other apparatus and methods described herein, directional terms, such as "above", "below", "upper", "lower", etc., are used only for convenience in referring to the accompanying drawings. Additionally, it is to be understood that the various embodiments of the present invention described herein may be utilized in various orientations, such as inclined, inverted, horizontal, vertical, etc., and in various configurations, without departing from the principles of the present invention.

In the method 10, it is desired to transmit data at a very high rate between multiple data source nodes in a well and a remote location. As depicted in FIG. 1, the data source nodes include geophones 12. The geophones 12 are biased outwardly from a tubing string 14 by bias members or springs 16. The springs 16 bias the geophones 12 into contact with a wellbore 18, which may be cased as shown in FIG. 1, or which may be uncased.

Note that the geophones 12 are illustrated in FIG. 1 as merely an example of the wide variety of data sources which may be used in a method incorporating principles of the present invention. Other types of sensors and other types of data sources may be used in keeping with the principles of the invention.

Only a small fraction of the total number of geophones 12 is depicted in FIG. 1. Preferred installations may include a hundred or more geophones 12 distributed along thousands of feet of the wellbore 18. However, it is to be clearly understood that any number of geophones 12 may be used in the method 10.

The geophones 12 communicate with a transceiver 20 located at the earth's surface or other remote location via a coaxial cable 22 extending into the well. The cable 22 serves as a transmission channel for communication between the transceiver 20 and each of the geophones 16. Of course, other types of transmission channels may be used in the method 10. For example, communication between the geophones 12 and the transceiver 20 may be via electromagnetic waves, acoustic pulses transmitted via fluid in the well, acoustic pulses transmitted via the tubing string 14, or any other type of transmission channel.

It is desired in the method 10 to transmit data from the geophones 12 to the transceiver 20 via the single cable 22. Note, however, that multiple cables may be used to communicate between the transceiver 20 and multiple respective groups of sensor nodes in the well, without departing from the principles of the invention.

Due to the high data rate desired and the use of a single transmission channel for communication between multiple widely distributed data source nodes and a remote location, a form of data transmission known to those skilled in the art as code division multiple access (CDMA) is used in the method 10. Furthermore, since the wide distribution of the data source nodes would otherwise cause a delay between reception of data transmitted from one node as compared to reception of data transmitted from another node (the delay increasing as the separation between the nodes increases), the method 10 includes provisions for synchronizing the transmissions from each of the nodes, so that data transmissions from all of the nodes are received at the transceiver 20 as if they simultaneously originated at a single location along the cable 22.

Figure 2:
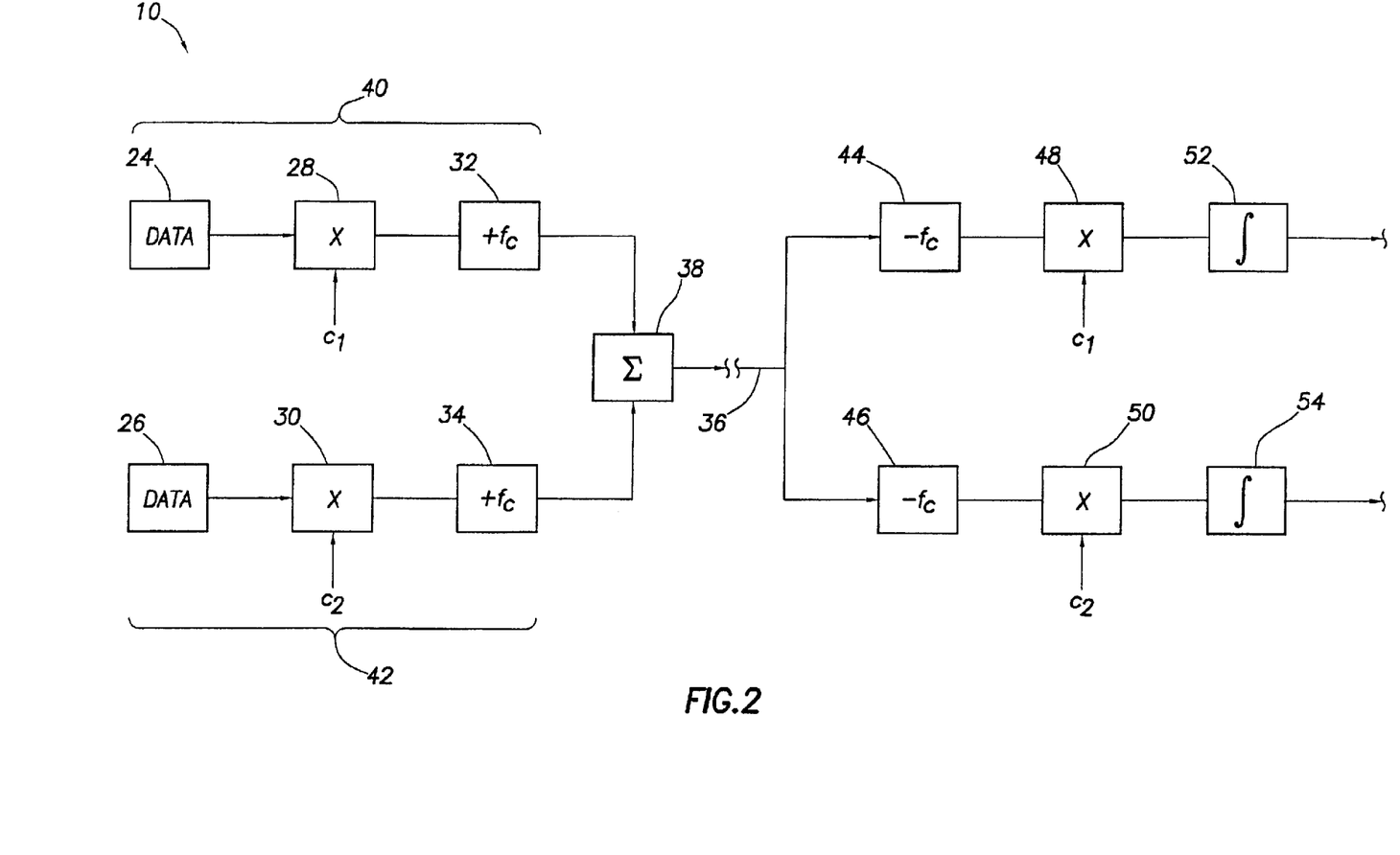
FIG. 2 is a schematic view of data transmission in the method of FIG. 1.

Referring additionally now to FIG. 2, data transmission in the method 10 is schematically represented. Only two data sources 24, 26 are depicted in FIG. 2 for clarity of illustration and description, but it is to be clearly understood that any number of data sources may be used. In the method 10, the data sources 24, 26 are two of the geophones 12 shown in FIG. 1, but it is to be understood that any other type of data source may be used instead of, or in addition to, geophones. Data output from the data sources 24, 26 is preferably in the form of a stream of digital bits, and so the output of an otherwise analog-type sensor would, for example, preferably be converted into digital form.

Each bit of data from data source 24 is multiplied by a unique code C1 by a multiplier 28 downhole, thereby encoding the data. Similarly, each bit of data from data source 26 is multiplied by another unique code C2 by a multiplier 30 downhole, thereby encoding that data. Where additional data sources are used, the output of each additional data source would likewise be multiplied by another respective unique code.

The codes C1, C2 are preferably of the type known to those skilled in the art as orthogonal codes, for purposes described more fully below. The use of orthogonal codes prevents interference and cross-talk between the transmissions. Most preferably, the codes C1, C2 are of the type known to those skilled in the art as walesh codes.

After being encoded with the codes C1, C2 by the multipliers 28, 30, the data is modulated with a carrier frequency fc by respective modulators 32, 34. Note that the same carrier frequency fc is used in modulating the encoded output of each of the data sources 24, 26.

The encoded and modulated data from each of the data sources 24, 26 are then summed on a transmission channel 36. This step is represented in FIG. 2 by a summing device 38, which may be a part of a transmitter of each data source node including, for example, a directional coupler. Thus, although only a single device 38 is depicted in FIG. 2, each data source node may include a separate device for performing this function.

In the method 10, the transmission channel 36 is the cable 22. However, as mentioned above, any other type of transmission channel may be used in place of the cable 22.

Each of the above-described steps is performed downhole. Thus, the data source 24, multiplier 28 and modulator 32 are part of one data source node 40, and the data source 26, multiplier 30 and modulator 34 are part of another data source node 42, each of which is positioned downhole. Each data source node 40, 42 may also include a summing device 38, as described above.

An alternative method of modulating and summing the encoded outputs of the data sources 24, 26 would be to first sum the encoded data and then modulate the summed and encoded data in a central downhole transmitter.

The transmission channel 36 extends from the data source nodes 40, 42 to a remote location. In the method 10, the remote location is the transceiver 20 at the earth's surface. However, any other remote location may be used, without departing from the principles of the present invention.

The encoded and modulated data is received at the remote location, where it is demodulated and decoded. The carrier frequency fc is extracted from the signal using demodulators 44, 46. Note that, as depicted in FIG. 2, separate demodulators 44, 46 are utilized, but it will be readily appreciated that a single demodulator could alternatively be used.

The demodulated signal is then separately multiplied by each of the codes C1, C2 using multipliers 48, 50, respectively. Due to the fact that the codes C1, C2 are orthogonal to each other, this multiplying step decodes the signal, in that the output of multiplier 48 includes contributions to the signal from the data source 24 but no contributions to the signal from the data source 26, and the output of multiplier 50 includes contributions to the signal from the data source 26 but no contributions to the signal from the data source 24. Note that, with some types of orthogonal codes, the codes should be transposed prior to this multiplying step.

The outputs of the multipliers 48, 50 are then separately integrated over the length of each data bit using integrators 52, 54, respectively. The outputs of the integrators 52, 54 will then be interpretable as the data output by the respective data sources 24, 26. Thus, the method 10 permits the data outputs of the data sources 24, 26 to be simultaneously transmitted to a remote location via a single transmission channel 36 and using a single carrier frequency fc, and then to be separated from each other at the remote location, without interference and cross-talk between the signals.

Note that the demodulators 44, 46, the multipliers 48, 50 and integrators 52, 54 in the method 10 are preferably included in the transceiver 20 at the earth's surface as shown in FIG. 1. However, it is to be clearly understood that any or all of these elements may be otherwise positioned, without departing from the principles of the invention.

In order for the contributions of the data sources 24, 26 to the transmitted signal to be properly decoded in the transceiver 20, it is important for the respective encoded data bits to be transmitted synchronously. That is, a data bit generated by the data source 24 and encoded at a particular point in time and a data bit generated by the data source 26 and encoded also at that particular point in time should be transmitted on the transmission channel 36 at the same time, so that they are received at the transceiver 20 at the same time. It will, however, be readily appreciated by one skilled in the art that, if the data sources 24, 26 are widely separated, or if variations in timing are induced in the modulators 32, 34 or summing device 38, the encoded data bits could be transmitted and received at different times. For this reason, the method 10 includes provisions for synchronizing transmissions of the encoded data bits from the respective data nodes 40, 42.

Figures 3, 4:
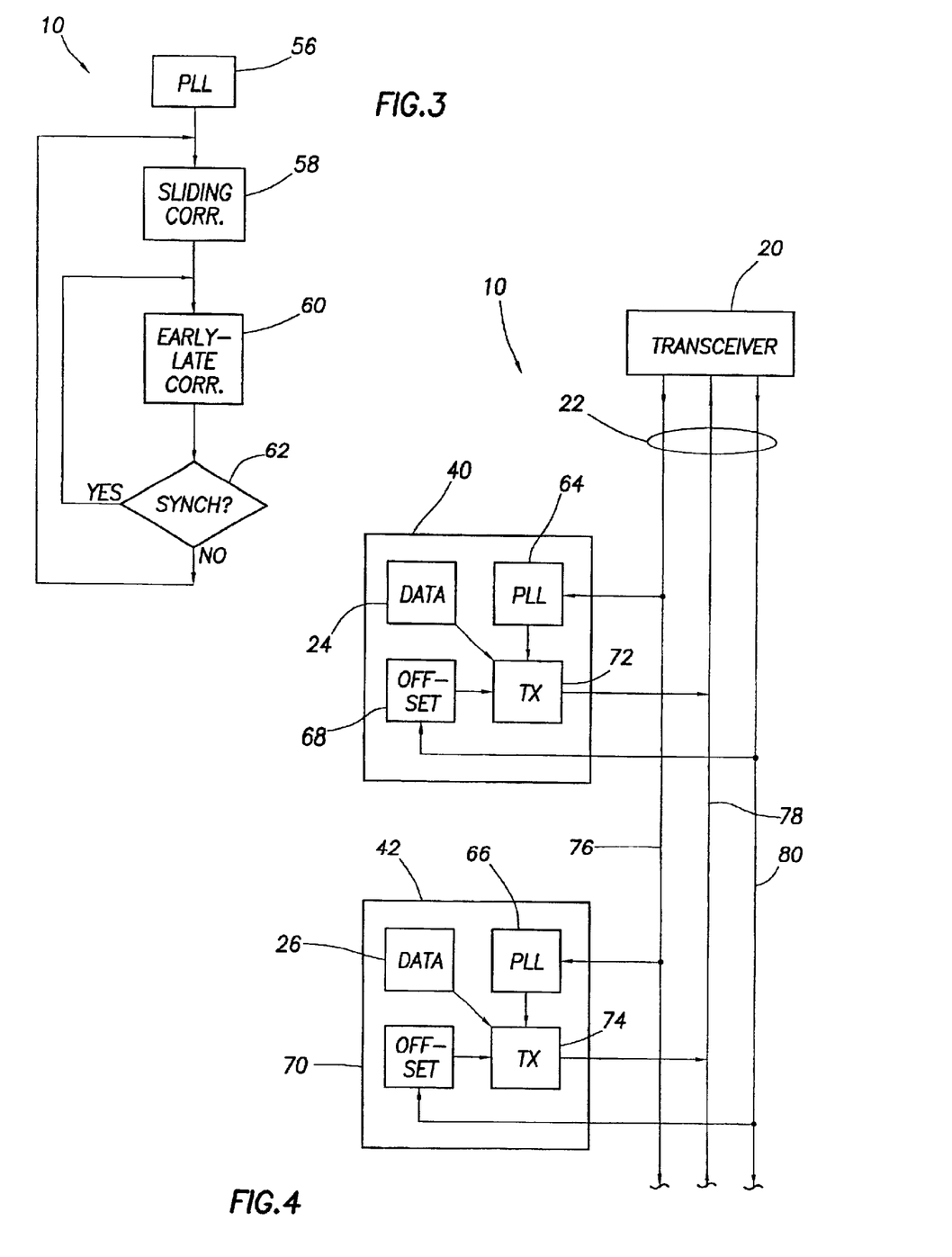
FIG. 3 is a flow chart illustrating data transmission synchronization in the method of FIG. 1.
FIG. 4 is a schematic view of a data telemetry system used in the method of FIG. 1.

Referring additionally now to FIG. 3, synchronization of the transmissions from the data nodes 40, 42 in the method 10 is schematically represented. Initially, the separate data transmissions are locked in phase by means of a phase lock loop 56 using techniques well known to those skilled in the art. Specifically, in the method 10, a sine wave or "tone" is broadcast continuously from the transceiver 20 to all of the downhole nodes 40, 42. Clocks in each of the nodes 40, 42 are locked in phase with the tone. Preferably, the tone is broadcast via the transmission channel 36.

A sliding correlator 58 is then used to synchronize the timing of each node to a reference node by adjusting an offset timer in each node 24, 26. Such sliding correlators are well known to those skilled in the art. In the example shown in FIG. 2 there are only two nodes 40, 42, and so one is chosen as a reference node and a delay is added to the transmissions from the other node using an offset timer therein, so that the transmissions from the nodes are synchronized. Preferably, the reference node is chosen as the node farthest from the transceiver 20, but this is not necessary in keeping with the principles of the invention.

Once synchronization is achieved using the sliding correlator 58, the synchronization is maintained by means of an early-late correlator 60 of the type well known to those skilled in the art. Preferably, the early-late correlator 60 maintains synchronization by subtracting an early correlation (for example, 1 bit early) from a late correlation to maintain synchronization.

In this manner, synchronization is obtained and maintained. If synchronization is lost, as represented by the "NO" result of step 62 representing a synchronization check, then the sliding correlator 58 is used to again obtain synchronization. If the result of step 62 is "YES", then the early-late correlator 60 continues to maintain the synchronization.

Referring additionally now to FIG. 4, an example is depicted of how synchronization of transmissions from the nodes 40, 42 in the method 10 may be accomplished in actual practice. Preferably, the transceiver 20 includes elements of the phase lock loop 56 (for example, conventional means for broadcasting the timing tone), the sliding correlator 58 and the early-late correlator 60. The nodes 40, 42 include additional elements 64, 66 of the phase lock loop 56 and offset timers 68, 70. The outputs of each of these are input to transmitters 72, 74, which then transmit the encoded data to the transceiver 20 via the cable 22. The transmitter 72 may include the multiplier 28, modulator 32 and a summing device 38, and the transmitter 74 may include the multiplier 30, modulator 34 and a summing device 38. Of course, each of the above elements may be otherwise positioned, without departing from the principles of the invention.

The cable 22 is represented in FIG. 4 by three lines 76, 78, 80. Line 76 represents the broadcast of the timing tone as part of the phase lock loop 56. As described above, the tone is broadcast to each of the nodes 40, 42. The separate downhole elements 64, 66 of the phase lock loop 56 receive the tone and lock the clocks in the transmitters 72, 74 in phase. Line 78 represents the transmission of the encoded, modulated and summed data from the nodes 40, 42 to the transceiver 20. Line 80 represents transmissions from the transceiver 20 to the offset timers 68, 70 of the nodes 40, 42 as a result of the sliding correlation described above. The offset timers 68, 70 delay transmissions from the transmitters 72, 74 as needed to obtain synchronization of the transmissions, as described above.

Although the three lines 76, 78, 80 are depicted in FIG. 4 as being separate, in actual practice they are on the same cable 22. For example, the phase lock loop tone represented by line 76 may be broadcast at one frequency, the transmissions from the nodes 40, 42 to the transceiver 20 may use another carrier frequency fc, and the transmissions from the transceiver 20 to the offset timers 68, 70 of the nodes 40, 42 may use yet another frequency.

Figure 5:
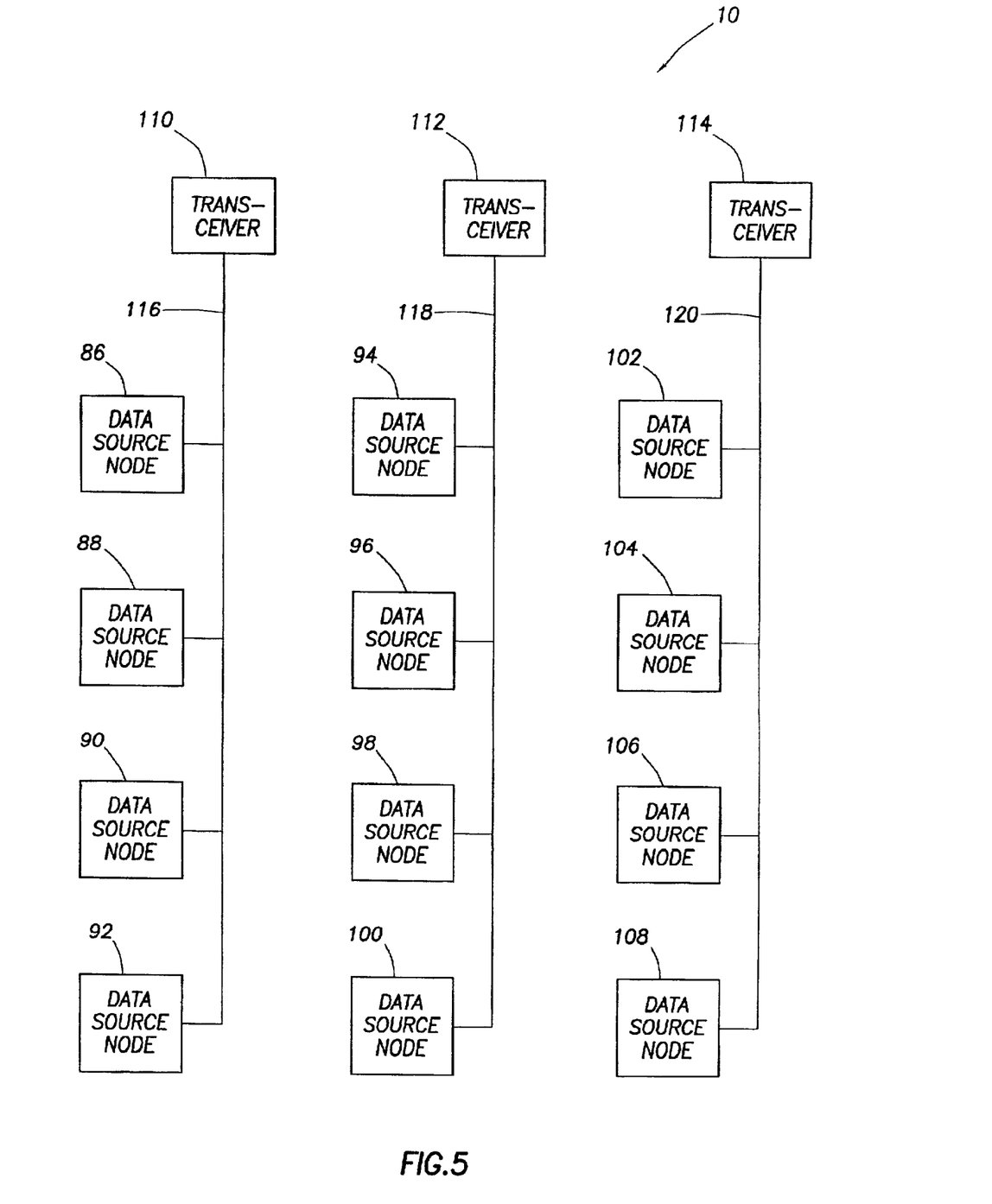
FIG. 5 is a schematic view of an alternate embodiment of a data telemetry system using in the method of FIG. 1.

Referring additionally now to FIG. 5, an alternative embodiment of the method 10 is representatively illustrated. In this embodiment, multiple frequency sub-bands are used for transmissions between downhole data source nodes 86, 88, 90, 92, 94, 96, 98, 100, 102, 104, 106, 108 and multiple transceivers 110, 112, 114 positioned at a remote location. The data source nodes 86, 88, 90, 92, 94, 96, 98, 100, 102, 104, 106, 108 may be similar to the data source nodes 40, 42 described above, and the transceivers 110, 112, 114 may be similar to the transceiver 20 described above.

Note that, although three transceivers communicating with four data source nodes each are depicted in FIG. 5, any number of transceivers and data source nodes may be used in keeping with the principles of the invention. Preferably, the illustrated data source nodes 86, 88, 90, 92, 94, 96, 98, 100, 102, 104, 106, 108 are installed in a well, such as the geophones 12 shown in FIG. 1, and the transceivers 110, 112, 114 are located at the earth's surface, but other positionings of these elements may be used without departing from the principles of the invention.

The frequency sub-bands are obtained by dividing a total usable system bandwidth by a desired number of sub-bands. For example, if the total usable system bandwidth is 80 MHz and the desired number of sub-bands is four, then each sub-band will have a bandwidth of 20 MHz.

A separate sub-band is used for transmissions between respective sets of data source nodes and transceivers. For example, transmissions between the data source nodes 86, 88, 90, 92 and the transceiver 110 would use a first sub-band, transmissions between data source nodes 94, 96, 98, 100 and the transceiver 112 would use a second sub-band and transmissions between the data source nodes 102, 104, 106, 108 and the transceiver 114 would use a third sub-band. These transmissions are represented in FIG. 5 by separate lines 116, 118, 120, but it is to be understood that the transmissions are preferably via a single transmission channel, such as the cable 22 described above. Transmissions from each set of data source nodes to its respective transceiver would be modulated on a carrier frequency within its respective sub-band.

As an example of this embodiment of the method 10, assume that the total usable system bandwidth is 80 MHz and the total number of data source nodes is 200, with a data transmission rate from each data source node of 150 kbps.

A desired number of sub-bands for this example may be 20. In that case, each sub-band has a bandwidth of 4 MHz (80 MHz /20), the number of data source nodes per sub-band is 10 (200/20), and the data rate per sub-band is 1.5 Mbps (150 kbps×10). The total system data rate is, thus, 30 Mbps (1.5 Mbps×20).

Of course, a person skilled in the art would, upon a careful consideration of the above description of representative embodiments of the invention, readily appreciate that many modifications, additions, substitutions, deletions, and other changes may be made to the specific embodiments, and such changes are contemplated by the principles of the present invention. Accordingly, the foregoing detailed description is to be clearly understood as being given by way of illustration and example only, the spirit and scope of the present invention being limited solely by the appended claims.

What is claimed is:

1. A method of communicating data in a wellbore, the method comprising the steps of:
   installing multiple sensor nodes in the wellbore, each of the sensor nodes including at least one sensor producing a respective digital output;
   multiplying each sensor's output by a digital code unique to that sensor to thereby produce an encoded output of each sensor; and
   simultaneously transmitting the encoded outputs of the sensors to a remote location via a transmission channel.

2. The method according to claim 1, wherein in the installing step, the sensors include geophones.

3. The method according to claim 2, further comprising the step of biasing the sensors into contact with the wellbore, the sensors producing the respective digital outputs while the sensors are biased into contact with the wellbore.

4. The method according to claim 1, wherein in the multiplying step, the codes are orthogonal with respect to each other.

5. The method according to claim 4, wherein in the multiplying step, the orthogonal codes are walesh codes.

6. The method according to claim 1, wherein the transmitting step further comprises modulating the encoded sensor outputs with a carrier frequency.

7. The method according to claim 6, wherein the transmitting step further comprises summing the modulated encoded sensor outputs on the transmission channel.

8. The method according to claim 7, further comprising the step of receiving the summed modulated encoded sensor outputs at the remote location.

9. The method according to claim 8, wherein the receiving step further comprises demodulating the summed modulated encoded sensor outputs.

10. The method according to claim 9, wherein the receiving step further comprises multiplying the summed demodulated encoded sensor outputs by each of the codes, thereby separating the encoded sensor outputs.

11. The method according to claim 10, further comprising the step of integrating each of the separated encoded sensor outputs, thereby producing the respective digital outputs of the sensors.

12. The method according to claim 11, wherein in the integrating step, the separated encoded sensor outputs are integrated over each bit of the sensor outputs.

13. The method according to claim 1, wherein the multiplying step further comprises multiplying each bit of each sensor's output by the code corresponding to the respective sensor.

14. The method according to claim 1, wherein the transmitting step further comprises synchronously transmitting the encoded sensor outputs.

15. The method according to claim 14, wherein the transmitting step further comprises phase locking the transmissions from each of the sensor nodes.

16. The method according, to claim 15, wherein the phase locking step further comprises broadcasting a signal from the remote location to each of the sensor nodes.

17. The method according to claim 14, wherein the broadcasting step further comprises broadcasting the signal on the same transmission channel as used for transmitting the modulated encoded sensor outputs from the sensor nodes to the remote location.

18. The method according to claim 14, wherein the transmitting step further comprises utilizing a sliding correlator to adjust an offset timer of each sensor node so that transmissions from the node are synchronized with transmissions from a selected reference node.

19. The method according to claim 18, wherein the transmitting step further comprises utilizing an early-late correlator to maintain synchronization of transmissions from each node with transmissions from the reference node.

20. The method according to claim 1, further comprising the step of dividing the sensor nodes into multiple sets of sensor nodes, and wherein the transmitting step further comprises modulating the encoded outputs of the sensors of each set of sensor nodes with a separate carrier frequency.

21. The method according to claim 20, wherein the transmissions from the sets of sensor nodes and the remote location are via the same transmission channel.

22. The method according to claim 20, wherein multiple transceivers are installed at the remote location, and wherein each transceiver communicates with a respective one of the sets of sensor nodes via a separate frequency sub-band.

23. A method of communicating data in a wellbore, the method comprising the steps of:
   installing multiple data sources in the wellbore;
   encoding each bit of a digital output of each data source by multiplying the bit by a unique code corresponding to the data source, thereby producing an encoded output of each data source;
   transmitting the encoded data source outputs simultaneously on the same transmission channel to a remote location; and
   separating the data source outputs at the remote location by multiplying each bit of the simultaneously transmitted encoded data source outputs by each of the codes.

24. The method according to claim 23, wherein in the encoding and separating steps, the codes are orthogonal to each other.

25. The method according to claim 24, wherein in the encoding and separating steps, the codes are walesh codes.

26. The method according to claim 23, wherein in the transmitting step, the encoded data source outputs are synchronously transmitted on the transmission channel.

27. The method according to claim 23, wherein the transmitting step further comprises modulating the encoded data source outputs on a carrier frequency and summing the modulated encoded data source outputs on the transmission channel.

28. The method according to claim 23, wherein the encoding step is performed in the wellbore.

29. The method according to claim 23, wherein the transmitting step is performed in the wellbore.

30. The method according to claim 23, further comprising the step of integrating each bit of the separated data source outputs.

31. The method according to claim 23, further comprising the step of dividing the data sources into multiple sets of data sources, and wherein the transmitting step further comprises modulating the encoded outputs of each set of data sources with a separate carrier frequency.

32. The method according to claim 31, wherein the transmissions from the sets of data sources and the remote location are via the same transmission channel.

33. The method according to claim 31, wherein multiple transceivers are installed at the remote location, and wherein each transceiver communicates with a respective one of the sets of data sources via a separate frequency sub-band.

* * * * *

UNITED STATES PATENT AND TRADEMARK OFFICE
CERTIFICATE OF CORRECTION

| | |
|---|---|
| PATENT NO. | : 6,819,260 B2 |
| DATED | : November 16, 2004 |
| INVENTOR(S) | : Wallace R. Gardner and Roger L. Schultz |

It is certified that error appears in the above-identified patent and that said Letters Patent is hereby corrected as shown below:

<u>Title page,</u>
Item [30], Foreign Application Priority Data, delete "Jul. 3" and insert in place thereof -- Mar. 7 --.

Signed and Sealed this

Nineteenth Day of April, 2005

JON W. DUDAS
*Director of the United States Patent and Trademark Office*